Patented Jan. 1, 1952

UNITED STATES PATENT OFFICE 2,581,016

2,581,016

PROCESS FOR SULFONATING 1-AMINO-ANTHRAQUINONES

Paul Grossmann, Binningen, Switzerland, assignor to Ciba Limited, Basel, Switzerland, a Swiss firm No Drawing. Application December 6, 1948, Serial No. 63,853. In Switzerland December 24, 1947

7 Claims. (Cl. 260—371)

There exist many publications relating to the manufacture of 1-aminoanthraquinone-2-sulfonic acid which, as is known, is a valuable intermediate product in the manufacture of 1-amino-4-bromanthraquinone-2-sulfonic acid, which is itself used for the production of many valuable anthraquinone dyestuffs. Thus, fairly recently, it has been proposed to sulfonate 1-aminoanthraquinone and derivatives thereof by means of chlorosulfonic acid in the presence of a high boiling organic solvent such as ortho-dichlorobenzene, tetrachlorethane, etc. (see United States Patent No. 2,135,346 and the literature referred to therein).

The present invention is based on the observation that 1-aminoanthraquinones can be sulfonated with advantage by treating them with a sulfonating agent, such as chlorosulfonic acid, oleum or sulfur trioxide, in the presence of a tertiary base difficult to sulfonate.

As aminoanthraquinones there may be used, for example, 1-aminoanthraquinones which may be substituted in a very wide variety of ways, for example, by nitro groups, halogen atoms especially chlorine atoms, methoxy groups or sulfonic acid or carboxyl groups, or may contain a further amino group. As examples there may be mentioned: 1-amino-5-nitro-anthraquinone, 1-amino-6-chloranthraquinone, 1-amino-6:7-dichloranthraquinone, 1-amino-5-methoxyanthraquinone, 1-aminoanthraquinone-5-sulfonic acid or -5-carboxylic acid, 1-amino-5:8-dichloranthraquinone, or 1:5- or 1:8-diaminoanthraquinone. The process of the invention is of special importance for sulfonating 1-aminoanthraquinone itself.

As tertiary bases which are difficult to sulfonate there may be used, for example, quinoline, a technical mixture of quinoline homologues or crude pyridine which is a technical mixture of pyridine homologues, and especially pyridine itself. Alternatively, a non-aromatic tertiary base such as dimethylamino-cyclohexane may be used.

The reaction medium may consist solely of the base difficult to sulfonate and the sulfonating agent or, if desired, there may be added a small or large quantity of an inert solvent such as nitrobenzene, tetrachlorethane or ortho-dichlorobenzene. In many cases it is of advantage to work with the addition of an inert solvent.

The relative proportions of the base difficult to sulfonate and the sulfonating agent are of material importance in so far as a considerable excess of the basic component over the equimolecular quantity relatively to the sulfonating agent used is disadvantageous. Advantageously, the base is used in a proportion not more than three times the molecular quantity relatively to the sulfonating agent. Good results are obtained with quantities in the vicinity of the equimolecular proportions, for example, from about 0.5 to 2, advantageously about 0.8 to 1.3, molecular proportions of the base per molecular proportion of sulfonating agent. The sulfonation takes place smoothly when, for example, equimolecular proportions of pyridine and sulfur trioxide are allowed to react together and the resulting anhydro-N-pyridinium sulfonic acid is used for carrying out the sulfonating reaction with the addition of an inert solvent. A certain excess of pyridine above the equimolecular quantity is indicated when an inert solvent is not used, because otherwise the reaction mixture may be difficult to stir or may even be solid.

The use of a certain excess of the sulfonating agent above the quantity theoretically required to sulfonate the amino-anthraquinone is usually desirable.

It is surprising that the sulfonation process of the invention takes place at relatively low temperatures, for example, temperatures ranging from 90° C. to 120° C., whereas in the known processes considerably higher temperatures are necessary. It appears that in the procedure under the process of the invention the formation of the amino-anthraquinone sulfate or hydrochloride is avoided to a great extent, and that for this reason the sulfonation takes place relatively easily.

When 1-aminoanthraquinone itself is used as starting material to prepare 1-aminoanthraquinone-2-sulfonic acid by the process of the invention, unsulfonated residues are avoided to a great extent.

It has also been found that 1-aminoanthraquinone-2-sulfonic acid can be brominated with advantage in the same reaction medium as has been described above. The process of the invention is therefore of importance, because the isolation of the 1-aminoanthraquinone-2-sulfonic acid can be dispensed with in many cases and it is possible to prepare 1-amino-4-bromanthraquinone-2-sulfonic acid in a very simple manner. The bromination may be carried out in the usual manner, for example, at room temperature or a slightly raised temperature.

The following examples illustrate the invention, the parts and percentages being by weight:

Example 1

8.9 parts of 1-aminoanthraquinone are heated in 100 parts of nitrobenzene with 9.5 parts of pyridine and 14 parts of chlorosulfonic acid for 16 hours at 120° C. After the addition of sodium carbonate and water the nitrobenzene is expelled by means of steam, the alkaline solution is filtered, and the 1-aminoanthraquinone-2-sulfonic acid is precipitated in the form of its sodium salt by the addition of sodium chloride.

Example 2

17.8 parts of 1-aminoanthraquinone are heated in 100 parts of tetrachlorethane with 17 parts of pyridine and 28 parts of chlorosulfonic acid for 16 hours at 120° C. while stirring well. The resulting 1-aminoanthraquinone-2-sulfonic acid is worked up as described in Example 1. The pure pyridine used in this example may be replaced by anhydrous crude pyridine and a very similar result is obtained.

Example 3

8.9 parts of 1-aminoanthraquinone are heated in 100 parts of ortho-dichlorobenzene with 8.5 parts of pyridine and 14 parts of chlorosulfonic acid for 16 hours at 120° C. The product is worked up as described in Example 1.

Example 4

8.9 parts of 1-aminoanthraquinone are introduced into a mixture of 25.5 parts of pyridine and 28 parts of chlorosulfonic acid at 95–100° C., and the whole is stirred at that temperature for 10–16 hours. After the addition of sodium carbonate, the pyridine is expelled by means of steam, and the 1-aminoanthraquinone-2-sulfonic acid is precipitated in the form of its sodium salt by the addition of sodium chloride. The pure pyridine used in this example may be replaced by anhydrous crude pyridine and a very similar result is obtained.

In any one of the foregoing examples there may be used instead of 1-aminoanthraquinone, the equivalent quantity of 1-amino-5-nitroanthraquinone, 1 - amino - 6 - chloranthraquinone, 1 - amino-6:7-dichloranthraquinone, 1:8-diaminoanthraquinone, 1 - aminoanthraquinone - 5 - sulfonic acid or -5-carboxylic acid.

Example 5

10 parts of 1-amino-5-methoxyanthraquinone are introduced into a mixture of 25.5 parts of pyridine and 28 parts of chlorosulfonic acid at 95–100° C., and the whole is stirred at that temperature for 4 hours. The product is worked up as described in Example 4 and a good yield of 1-amino-5-methoxyanthraquinone-2-sulfonic acid is obtained.

Example 6

10 parts of 1:5-diaminoanthraquinone are introduced into a mixture of 51 parts of pyridine and 56 parts of chlorosulfonic acid at 95–100° C., and the whole is maintained at that temperature for 2 hours while stirring. The product is worked up as described in Example 4 and 1:5-diaminoanthraquinone-sulfonic acid is obtained in good yield.

Example 7

10 parts of 1-amino-8-chloranthraquinone are introduced into a mixture of 25.5 parts of pyridine and 28 parts of chlorosulfonic acid at 97° C., and the whole is stirred at that temperature for about 6 hours. After working up in the manner described in Example 4, 1-amino-8-chloranthraquinone-2-sulfonic acid is obtained in good yield.

The reaction can be carried out in an analogous manner with 1-amino-5-chloranthraquinone or 1-amino-5:8-dichloranthraquinone.

Example 8

8.9 parts of 1-aminoanthraquinone are heated in 100 parts of tetrachlorethane with the addition of 9.6 parts of anhydro-N-pyridinium sulfonic acid (obtained from equimolecular proportions of pure pyridine and sulfur trioxide) for 20 hours at 120° C. The resulting 1-aminoanthraquinone-2-sulfonic acid is worked up as described in Example 1.

Example 9

16.1 parts of anhydrous crude pyridine (a technical mixture of pyridine homologues), and 28 parts of oleum of 65 per cent. strength, and subsequently 22.3 parts of 1-aminoanthraquinone are introduced into 200 parts of tetrachlorethane while stirring well, and the whole is heated for 6 hours at 96–100° C. The resulting 1-aminoanthraquinone-2-sulfonic acid is worked up as described in Example 1. The 1-aminoanthraquinone is completely sulfonated.

Example 10

20.6 parts of quinoline and 20 parts of oleum of 65 per cent. strength and subsequently 22.3 parts of 1-aminoanthraquinone, are introduced into 200 parts of tetrachlorethane while stirring, and the whole is heated for 12 hours at 95–100° C. The resulting 1-aminoanthraquinone-2-sulfonic acid is worked up as described in Example 1. The 1-aminoanthraquinone is completely sulfonated.

Having thus described the invention, what is claimed is:

1. A process for the manufacture of anthraquinone derivatives, wherein a 1-aminoanthraquinone is treated with a sulfonating agent in the presence of a tertiary amine base difficult to sulfonate, the molecular proportion between tertiary base and sulfonating agent being less than 3 to 1, whereby sulfonation of the 1-aminoanthraquinone takes place with formation of aminoanthraquinone sulfonic acid.

2. A process for the manufacture of anthraquinone derivatives, wherein a 1-aminoanthraquinone is treated with a sulfonating agent in the presence of a tertiary amine base difficult to sulfonate, the process being conducted in the presence of an inert solvent, the molecular proportion between tertiary base and sulfonating agent being less than 3 to 1, whereby sulfonation of the 1-aminoanthraquinone takes place with formation of aminoanthraquinone sulfonic acid.

3. A process for the manufacture of anthraquinone derivatives, wherein a 1-aminoanthraquinone is treated with a sulfonating agent in the presence of crude pyridine, the molecular proportion between the pyridine and sulfonating agent being less than 3 to 1, whereby sulfonation of the 1-aminoanthraquinone takes place with formation of aminoanthraquinone sulfonic acid.

4. A process for the manufacture of anthraquinone derivatives, wherein a 1-aminoanthraquinone is treated with a sulfonating agent in the presence of pure pyridine, the molecular proportion between the pyridine and sulfonating agent being less than 3 to 1, whereby sulfonation of the 1-aminoanthraquinone takes place with formation of aminoanthraquinone sulfonic acid.

5. A process for the manufacture of anthraquinone derivatives, wherein a 1-aminoanthraquinone is treated with a sulfonating agent in the presence of a tertiary amine base difficult to sulfonate, the sulfonating agent and the tertiary amine base being used in approximately equimolecular proportions relatively to one another, the process being conducted in the presence of an inert solvent, whereby sulfonation of the 1-aminoanthraquinone takes place with formation of aminoanthraquinone sulfonic acid.

6. A process for the manufacture of anthraquinone derivatives, wherein a 1-aminoanthraquinone is treated with a sulfonating agent in the presence of a tertiary amine base difficult to sulfonate, 0.8 to 1.5 molecular proportions of the tertiary amine base being used per molecular proportion of sulfonating agent, the process being conducted in the presence of an inert solvent, whereby sulfonation of the 1-aminoanthraquinone takes place with formation of aminoanthraquinone sulfonic acid.

7. A process for the manufacture of 1-aminoanthraquinone-2-sulfonic acid consisting in treating 1-aminoanthraquinone at temperatures not exceeding 120° C. with a sulfonating agent in the presence of crude pyridine, the sulfonating agent and the crude pyridine being used in approximately equimolecular proportions relatively to one another, the process being conducted in the presence of an inert solvent, whereby sulfonation of the 1-aminoanthraquinone takes place with formation of aminoanthraquinone sulfonic acid.

PAUL GROSSMANN.

REFERENCES CITED

The following references are of record in the file of this patent:

UNITED STATES PATENTS

| Number | Name | Date |
| --- | --- | --- |
| 1,871,466 | Peter | Aug. 16, 1932 |
| 2,360,010 | Ogilvie | Oct. 10, 1944 |
| 2,413,790 | Seymour et al. | Jan. 7, 1947 |

FOREIGN PATENTS

| Number | Country | Date |
| --- | --- | --- |
| 319,805 | Great Britain | Sept. 30, 1929 |
| 141,023 | Switzerland | Sept. 16, 1930 |